US012270540B2

(12) United States Patent
Boye et al.

(10) Patent No.: US 12,270,540 B2
(45) Date of Patent: Apr. 8, 2025

(54) DEEP CLEANING ALIGNMENT EQUIPMENT

(71) Applicant: Precision Iceblast Corporation, Peshtigo, WI (US)

(72) Inventors: Keith R. Boye, Hobart, WI (US); Matthew Peterson, Green Bay, WI (US)

(73) Assignee: Precision Iceblast Corporation, Peshtigo, WI (US)

(*) Notice: Subject to any disclaimer, the term of this patent is extended or adjusted under 35 U.S.C. 154(b) by 387 days.

(21) Appl. No.: 17/729,133

(22) Filed: Apr. 26, 2022

(65) Prior Publication Data

US 2022/0252255 A1 Aug. 11, 2022

Related U.S. Application Data

(63) Continuation-in-part of application No. 16/204,281, filed on Nov. 29, 2018, now Pat. No. 11,313,632.
(Continued)

(51) Int. Cl.
*B08B 5/02* (2006.01)
*B08B 3/02* (2006.01)
(Continued)

(52) U.S. Cl.
CPC ............. *F22B 37/486* (2013.01); *B08B 3/02* (2013.01); *B08B 5/02* (2013.01); *B08B 7/00* (2013.01);
(Continued)

(58) Field of Classification Search
CPC ... F28G 1/166; F28G 1/14; F28G 9/00; F28G 9/005; F22B 37/54; F22B 37/486;
(Continued)

(56) References Cited

U.S. PATENT DOCUMENTS 2,112,896 A 4/1938 Husband
4,344,570 A * 8/1982 Paseman ............ B05B 13/0627 239/206

(Continued)

FOREIGN PATENT DOCUMENTS

KR 10-1748802 6/2017

OTHER PUBLICATIONS

Schwartz, "43. Comparing Nylon FDM materials: Which is better", https://blog.trimech.com/comparing-nylon-fdm-materials-which-is-better (Year: 2017).*

(Continued)

*Primary Examiner* — Steven S Anderson, II
(74) *Attorney, Agent, or Firm* — Wong Meyer Smith & McConnell

(57) ABSTRACT

Systems and methods for cleaning a heat recovery steam generator system including tubes and fins associated therewith using deep cleaning alignment equipment are described. The deep cleaning alignment equipment primarily includes at least one wedge and at least one wand. The wedge may be an elongate wedge configured to maximize the surface area that contacts the tubes and fins, which in turn minimizes the amount of stress about any specific point of the tubes or the fins. Additionally, the wedge may be made of a variety of different materials. The wedge may include multiple pieces that can be releasably secured together. The wedge may also have at least one opening formed therein to assist in removal of the wedge from the system.

20 Claims, 12 Drawing Sheets

Related U.S. Application Data

(60) Provisional application No. 62/597,179, filed on Dec. 11, 2017.

(51) Int. Cl.

| | |
|---|---|
| ***B08B 7/00*** | (2006.01) |
| ***B08B 9/023*** | (2006.01) |
| ***B08B 13/00*** | (2006.01) |
| ***B24C 1/00*** | (2006.01) |
| ***F22B 37/48*** | (2006.01) |
| ***F28G 1/16*** | (2006.01) |

(52) U.S. Cl.
CPC .............. *B08B 9/023* (2013.01); *B08B 13/00* (2013.01); *B08B 2209/02* (2013.01)

(58) Field of Classification Search
CPC . B08B 3/026; B08B 3/028; B08B 5/02; F28F 21/067
See application file for complete search history.

(56) References Cited

U.S. PATENT DOCUMENTS

| | | | | |
|---|---|---|---|---|
| 4,600,115 | A * | 7/1986 | Coussau | G21C 13/06 976/DIG. 175 |
| 4,827,953 | A | 5/1989 | Lee | |
| 4,831,969 | A | 5/1989 | Vollhardt et al. | |
| 4,980,120 | A * | 12/1990 | Bowman | F22B 37/483 376/310 |
| 5,194,217 | A | 3/1993 | St. Louis et al. | |
| 5,237,718 | A | 8/1993 | Brown | |
| 5,555,851 | A | 9/1996 | Vandenberg | |
| 5,570,660 | A | 11/1996 | Vandenberg | |
| 5,572,957 | A | 11/1996 | Vandenberg | |
| 7,204,208 | B2 * | 4/2007 | Johnson | F22B 37/48 134/167 R |
| 8,002,902 | B2 * | 8/2011 | Krowech | F22B 37/54 15/104.04 |
| 8,238,510 | B2 | 8/2012 | Haberman | |
| 8,752,511 | B2 | 6/2014 | Hawkins et al. | |
| 8,757,104 | B2 | 6/2014 | Hawkins et al. | |
| 8,800,499 | B2 | 8/2014 | Hawkins et al. | |
| 8,800,500 | B2 | 8/2014 | Hawkins et al. | |
| 2004/0129388 | A1 * | 7/2004 | Brazil | B60C 25/02 157/1.3 |
| 2008/0022949 | A1 * | 1/2008 | Harth | F28F 9/0132 122/511 |
| 2009/0230217 | A1 * | 9/2009 | Stone | B08B 3/026 239/525 |
| 2012/0031350 | A1 | 2/2012 | Zhang et al. | |
| 2016/0116158 | A1 * | 4/2016 | Krowech | F28G 1/166 15/104.04 |
| 2017/0016686 | A1 | 1/2017 | Kim et al. | |
| 2017/0022460 | A1 * | 1/2017 | Suchard | F28G 1/166 |
| 2017/0089651 | A1 * | 3/2017 | Suchard | C11D 17/06 |
| 2019/0293372 | A1 * | 9/2019 | Hong | B05B 13/0415 |

OTHER PUBLICATIONS

International Search Report and Written Opinion of PCT/US2018/63295 dated Feb. 14, 2019 (13 pages).
Morgan Schwartz, Nylon Materials Offered by Stratasys and Comparing Nylon FDM Material—Which is better, TriMech Blog, Sep. 8, 2017, 9 pages.

* cited by examiner

FIG. 17
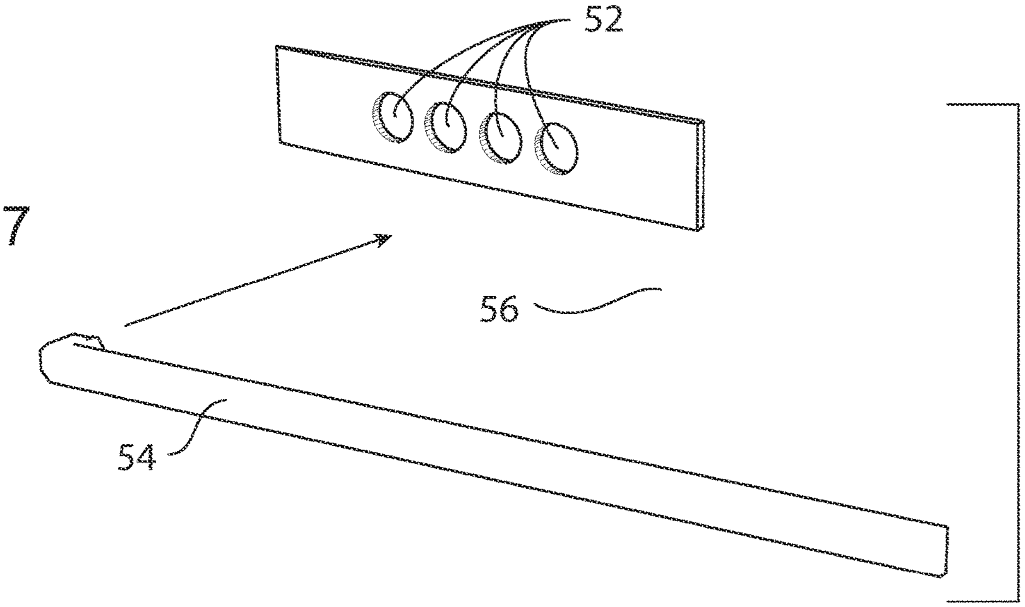
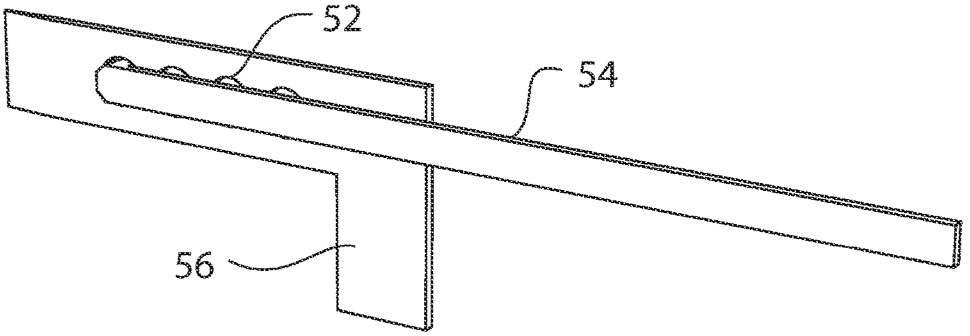
FIG. 18
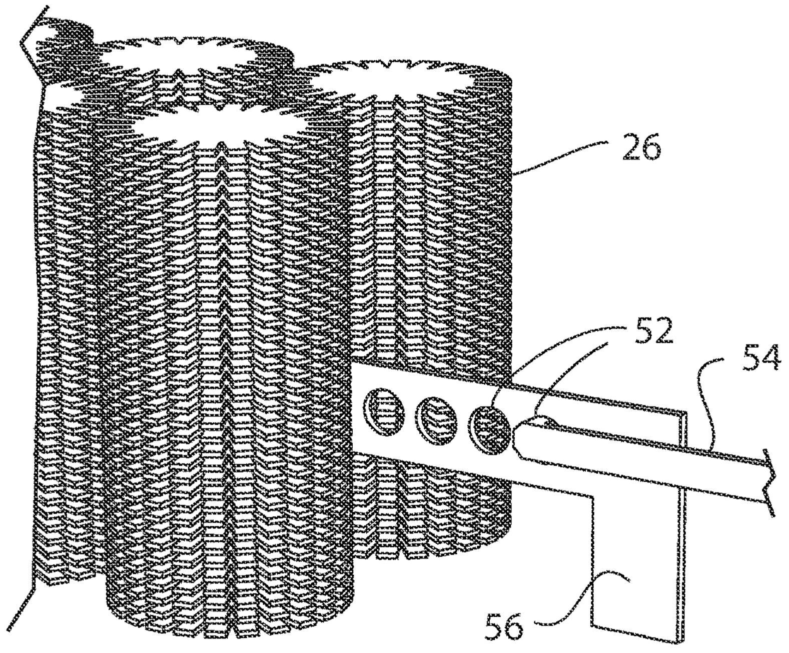
FIG. 19

DEEP CLEANING ALIGNMENT EQUIPMENT

CROSS-REFERENCE(S) TO RELATED APPLICATION(S)

This present application is a continuation-in-part application that claims priority to U.S. patent application Ser. No. 16/204,281 filed on Nov. 29, 2018 and entitled Deep Cleaning Alignment Equipment, which claims priority on U.S. Provisional Patent Application Ser. No. 62/597,179, filed on Dec. 11, 2017 and entitled Deep Cleaning Alignment Equipment, the entire contents of both are hereby expressly incorporated by reference into the present application.

BACKGROUND OF THE INVENTION

1. Field of the Invention

The invention relates generally to power plants that produce electricity including a heat recovery steam generator (HRSG) with boiler tubes therein and, in particular, to equipment used to improve the ease with which modules housing these boiler tubes can be cleaned.

2. Discussion of the Related Art

A combined-cycle power plant uses both a gas and a steam turbine together to produce up to 50 percent more electricity: from the same fuel than a traditional simple-cycle plant. The waste heat from the gas turbine is routed through a Heat Recovery Steam Generator (HRSG) to the nearby steam turbine, which generates extra power. The boiler tubes within these I-MSG's are contained within different sized modules and have varying numbers of tubes within each module. The modules in the HRSG generally consist of some composition of the following modules: Feedwater 1, Feedwater 2, LP Economizer, IP Economizer, HP Economizer, LP Evaporator, IP Evaporator, HP Evaporator, LP Preheater, IP Preheater, 1-IP Preheater, LP Superheater, IP Superheater, 1-IP Superheater, LP Reheater, IP Reheater, and 1-IP Reheater. When these systems get dirty, the rate of heat transfer can be reduced, which in turn reduces the efficiency of such systems.

Cleaning inside of the modules can be very difficult. In the past, the methods available were only able to clean the first one to two rows of tubes. By creating an access lane between boiler tubes, enough space can be created between tubes to insert specialized wands that allow all of the boiler tubes in the module to be cleaned. In the past, this space would be created by inserting a metallic pointed wedge-like lancer between the tubes. Once the access lane is created, a wand is used to spray a liquid or gas, traditionally air, to clean the tubes and associated components. Oftentimes, these wands are merely configured to spray air directly, ahead. As a result, the wand must be inserted into each and every row of tubes in order to clean the entire HRSG.

Traditionally, such wedge-like bars were made of steel. Similarly, most tubes inside HRSG's are made up of either carbon steel, stainless steel, T22 or T19. Because of the hard material of the wedge, use of these wedges oftentimes presented risk of damage to the tubes or associated fins. Additionally, the wedges are traditionally a pointed lance with a minimal height, which increases the amount of stress caused where the wedge touches the tubes. Furthermore, these wedges are oftentimes heavy and costly to transport.

Further still, while air is effective to clean some tube lanes, it can be ineffective to clean hard deposits.

What is therefore needed is deep cleaning alignment equipment that allows the tubes to be spread to create an access lane that does not damage the tubes or associated fins. What is further needed is a deep cleaning alignment equipment configured to spray various liquids or gases about the tubes and associated fins to clean the HRSG. What is further needed is a cleaning wand capable of spraying the liquids or gases at a variety of different angles relative to the tube lanes.

SUMMARY AND OBJECTS OF THE INVENTION

By way of summary, the present invention is directed to a deep cleaning alignment equipment that is used to clean a heat recovery steam generator system and a method associated therewith. The heat recovery steam generator system may include a plurality of metallic tubes. These tubes can be vertically mounted, horizontally mounted, or mounted at various other angles. Each of these tubes may include a base with a plurality of fins extending outwardly from the base.

In accordance with a first aspect of the invention, the deep cleaning alignment equipment may include an elongate wedge. The elongate wedge includes a width, a length, and a height and may be configured to contact and spread the tubes and fins to form a channel between the tubes. The elongate wedge is configured to contact the tubes and fins about an extended surface area. In turn, this minimizes a stress force between the wedge and the tubes.

In accordance with another aspect of the invention, the wedge may have a height of at least six inches. The wedge may further have a height of at least eight inches. Further still, the wedge may have a width of at least one half of an inch. Also, the wedge could have a width of one inch. Additionally, the wedge may have a length of at least three-and-a-half feet. Similarly, the wedge may have a length of at least five feet.

In accordance with a first aspect of the invention, the deep cleaning alignment equipment may include a composite wedge. The composite may be softer than the metallic material of the tubes and associated fins. For instance, the composite could be a high strength carbon nylon. More specifically, the wedge may be made of nylon 12CF. In other embodiments, the wedge may be of a metallic or other hard material. In yet other embodiments, the wedge may be made of a metallic or other hard material, but covered in a composite or other softer material. The wedge may or may not include a handle for gripping.

In accordance with another aspect of the invention, the deep cleaning alignment equipment may include a wand. The wand may be configured to spray one of a liquid or a gas about the heat recovery steam generator system. Additionally, the wand may be configured to be removably insertable into the channel formed by the wedge. The wand may have a first end and a second end opposite the first end. At the first end, a handle is mounted to the wand. At a second end, an exit may be formed. For instance, the exit may be configured to spray one of a liquid or a gas at an angle of approximately 30 degrees, 45 degrees, or at other angles relative to the channel.

In accordance to another aspect of the invention, multiple wands may be provided. More specifically, a first wand may be provided and a second wand may be provided. The first wand may be configured to push debris forward. Additionally, the second wand may be configured to shoot a liquid or a gas. For instance, the second wand may be configured to shoot dry ice. As stated above, either wand may be configured to spray liquid or gas at an angle of approximately 30 degrees, 45 degrees, or any other angle relative to the channel.

In accordance to another aspect of the invention, a method of using a deep cleaning alignment equipment used to clean a heat recovery steam generator system is described. The method includes the step of inserting an elongate composite wedge having a width, a length, and a height, between the tubes to spread the tubes to form a channel therebetween. The method may also include the steps of inserting a wand into the channel and spraying a liquid or a gas through the wand to clean the tubes and the fins. The method may further include the steps of inserting a first elongate composite wedge having a first width between the tubes, and then inserting a second elongate composite wedge having a second width between the tubes, where the first width is smaller than the second width. Further still, the method may include the step of spraying a quantity of dry ice through the wand to an exit to clean the tubes and fins, where the exit sprays the quantity of dry ice at an angle of approximately 30 degrees, 45 degrees, or any other angle relative to the channel.

In accordance with other aspects of the present invention, the various components may be made of a metallic material. In other embodiments, the various components may be made of composite or other materials. In accordance with yet another aspect of the present invention, the wedge may have a handle at an end. In other embodiments, the wedge may not have a handle.

In accordance with yet another aspect of the present invention, the wedge may be from approximately six inches to approximately nine feet in length, and more preferably between approximately three feet and approximately five feet in length. Additionally, the wedge may have a height of approximately a half of an inch to a height of approximately two feet, and more preferably has a height between approximately two inches and approximately eight inches. Further still, the wedge may have a width of between approximately $\frac{1}{8}^{th}$ of an inch and approximately four inches, and more preferably between approximately a half of an inch to approximately one and a half inches.

In accordance with yet another aspect of the present invention, the wedge may have at least one, and more preferably multiple openings formed in the wedge. These openings are configured such that various devices can be inserted into one or more of the openings in order to expedite and simplify the removal of the wedge from the heat recovery steam generator system. For instance, a lever, L bracket, or other device may be inserted into one or more of the openings, in which case the device can be used as a cantilever to help dislodge the wedge from the heat recovery steam generator system. For instance, a user may first use an outermost opening located closest to the end of the wedge that is not inserted into the heat recovery steam generator system. Once the wedge is moved away from the heat recovery steam generator system, the device may be inserted into a second opening that is exposed when the wedge is initially moved. The device can then move the wedge further from the heat recovery steam generator system. As many openings may be included as needed to incrementally remove the wedge from the heat recovery steam generator system. Additionally, the devices used to engage with the openings and remove the wedge from the heat recovery steam generator system may be a mechanical device where a user uses force to remove the wedge, or a pneumatic device could be used to simplify and expedite the removal of the wedge from the heat recovery steam generator system. These holes or openings may be in any desired size and at any desired spacing, for instance not less than approximately $\frac{1}{16}^{th}$ between consecutive holes, and not more than approximately three feet between consecutive holes.

In accordance with yet another aspect of the present invention, the wedge may also be a multi-piece wedge. For instance, the wedge may come in two or more pieces, which could potentially allow for cheaper and/or easier transportation of the wedge from one location to another. By way of example and not limitation, the various pieces of the multi-piece wedge may be secured to one another using threaded openings, interlocking components, jigsaw connections, and the like.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 17 is a side elevation view of an embodiment of the deep cleaning alignment equipment with a wedge having multiple openings formed therein;

FIG. 18 is a perspective view of the wedge of FIG. 17 with a removal bracket installed relative to one of the multiple openings; and FIG. 19 is a perspective view of the wedge of FIGS. 17-18 inserted in a heat recovery steam generator system with the removable bracket inserted therein to remove the wedge from the system.

Figure 1:
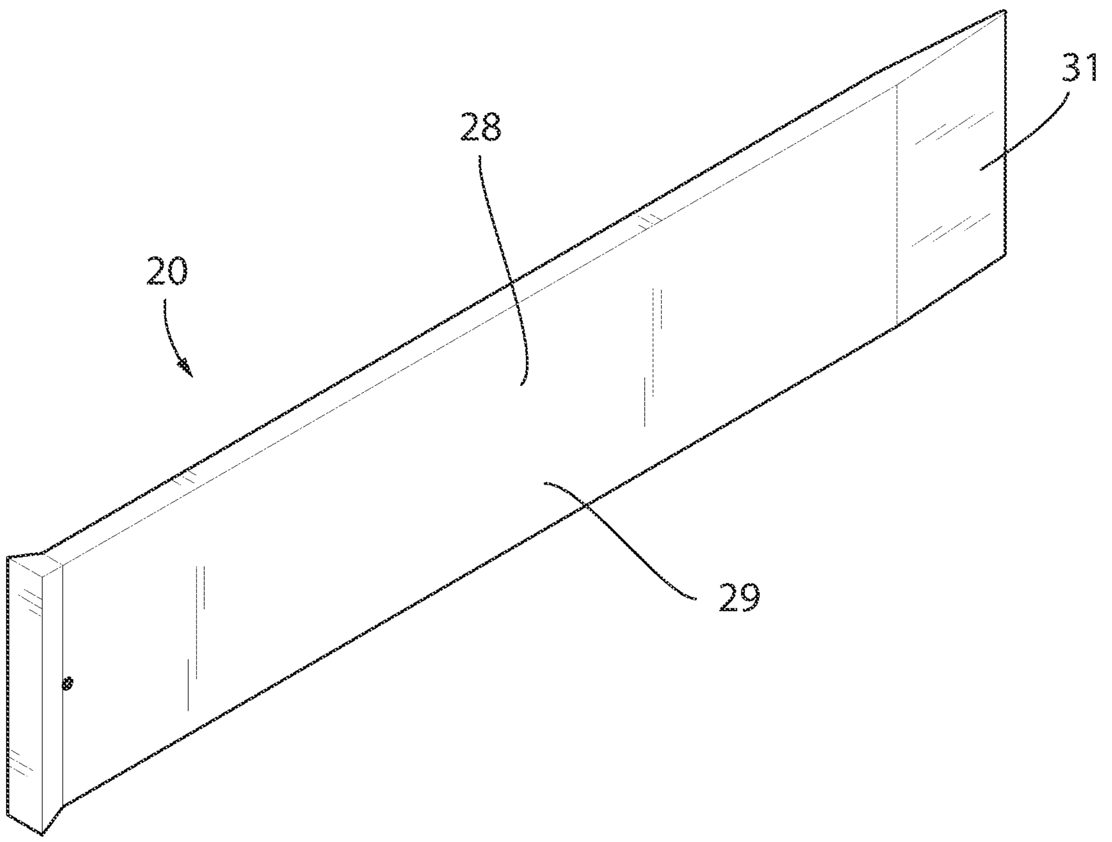
FIG. 1 illustrates an isometric view of a deep cleaning alignment equipment including a wedge.
Figure 2:
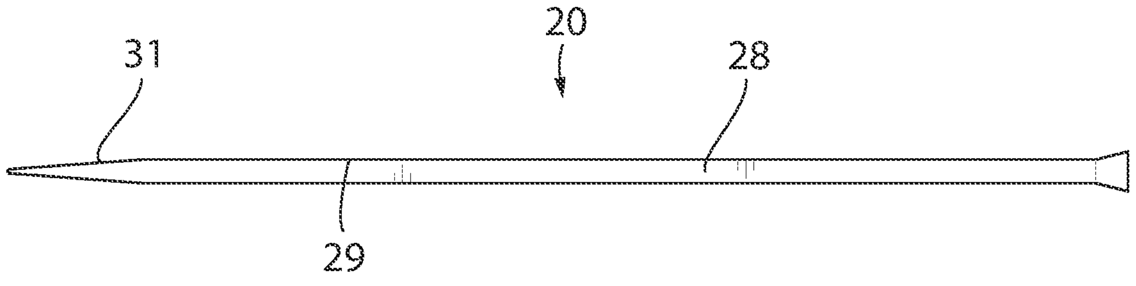
FIG. 2 illustrates a top or bottom plan view of the deep cleaning alignment equipment including the wedge of FIG. 1.
Figure 3:
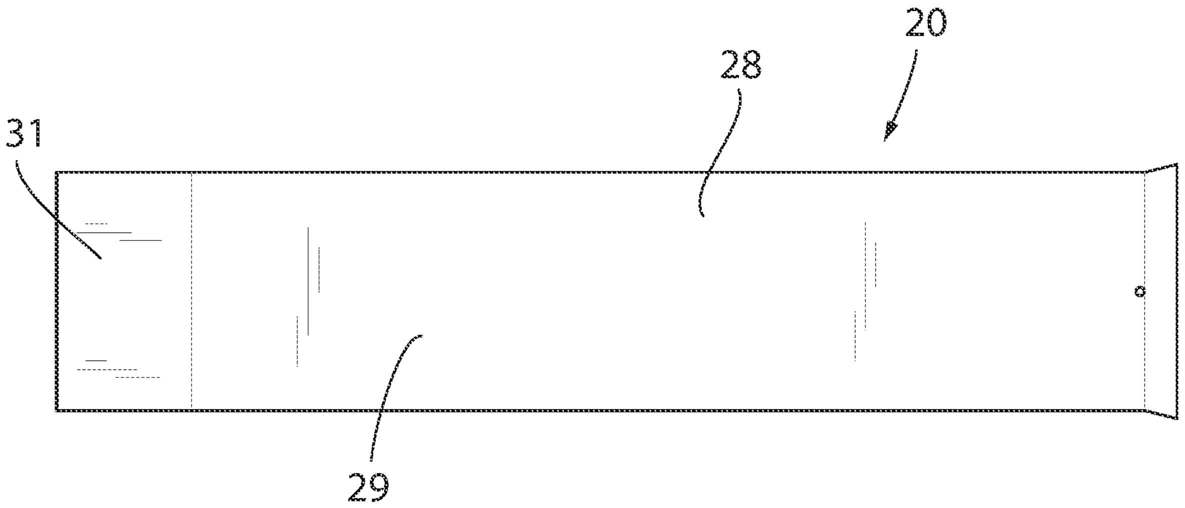
FIG. 3 is a side elevation view of the deep cleaning alignment equipment including the wedge of FIG. 1.
Figure 4:
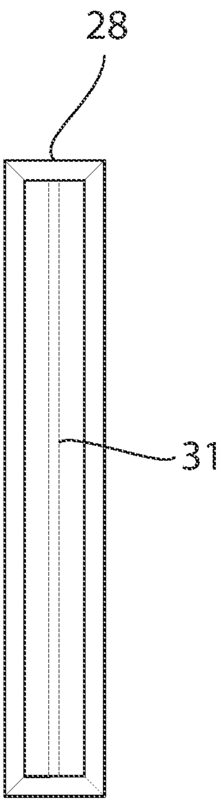
FIG. 4 is a front elevation view of the deep cleaning alignment equipment including the elongate wedge of FIG. 1.
Figure 5:
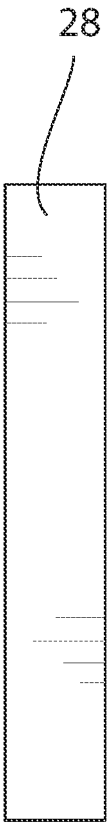
FIG. 5 is a rear elevation view of the deep cleaning alignment equipment including the elongate wedge of FIG. 1.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

Figure 6:
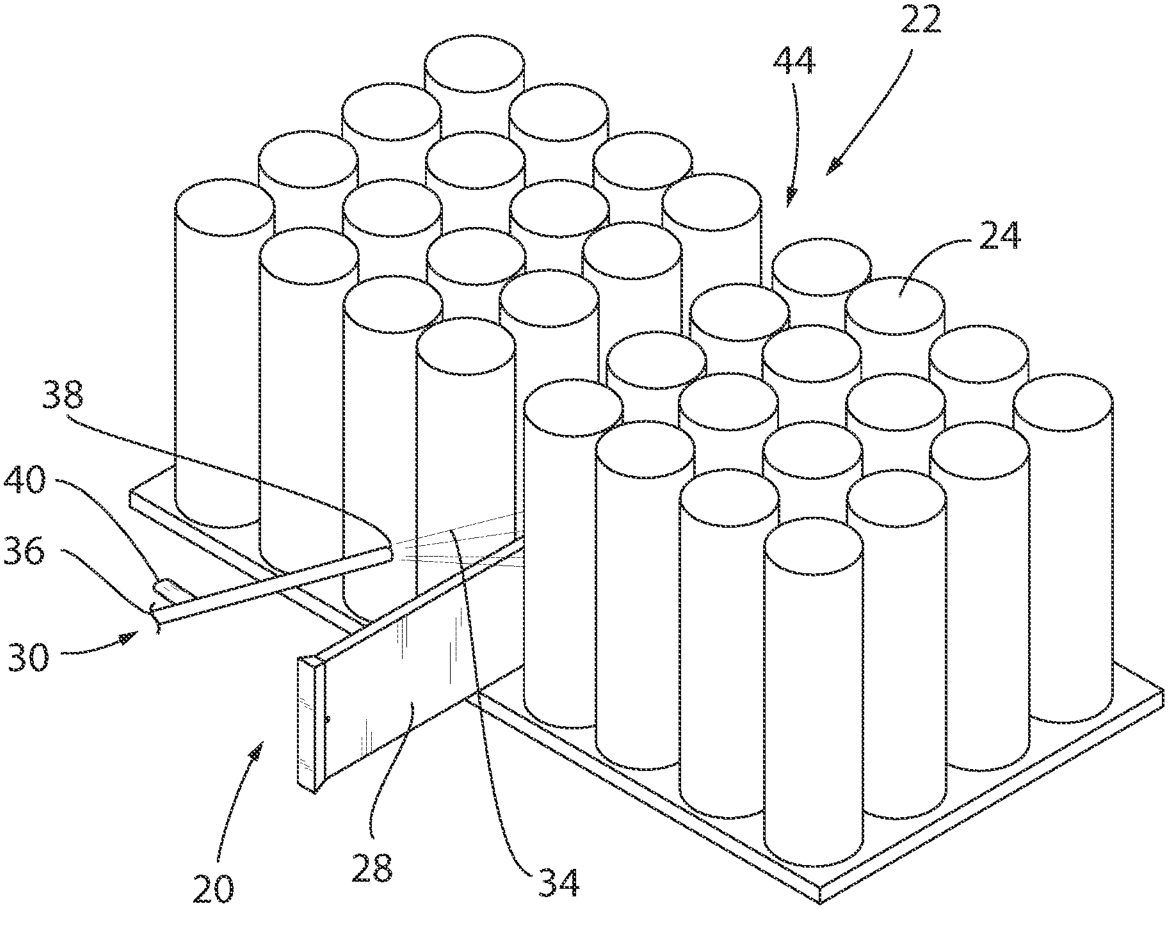
FIG. 6 is an isometric view of the deep cleaning alignment equipment of FIG. 1 as the wedge is inserted into a heat recovery steam generator to spread a plurality of tubes to create a channel for a cleaning wand.
Figure 7:
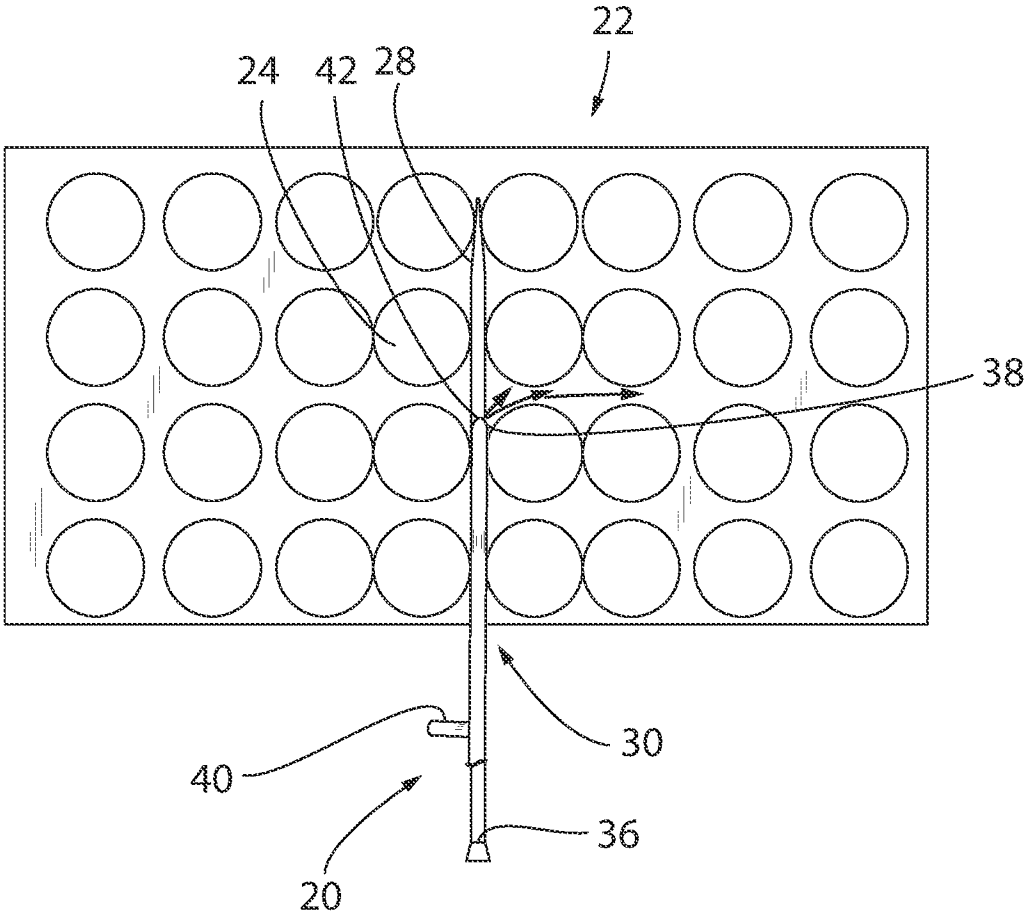
FIG. 7 is a top plan view of the deep cleaning alignment equipment with the wedge spreading the plurality of tubes and the cleaning wand dispensing a cleaning solution to the heat recovery steam generator.
Figure 8:
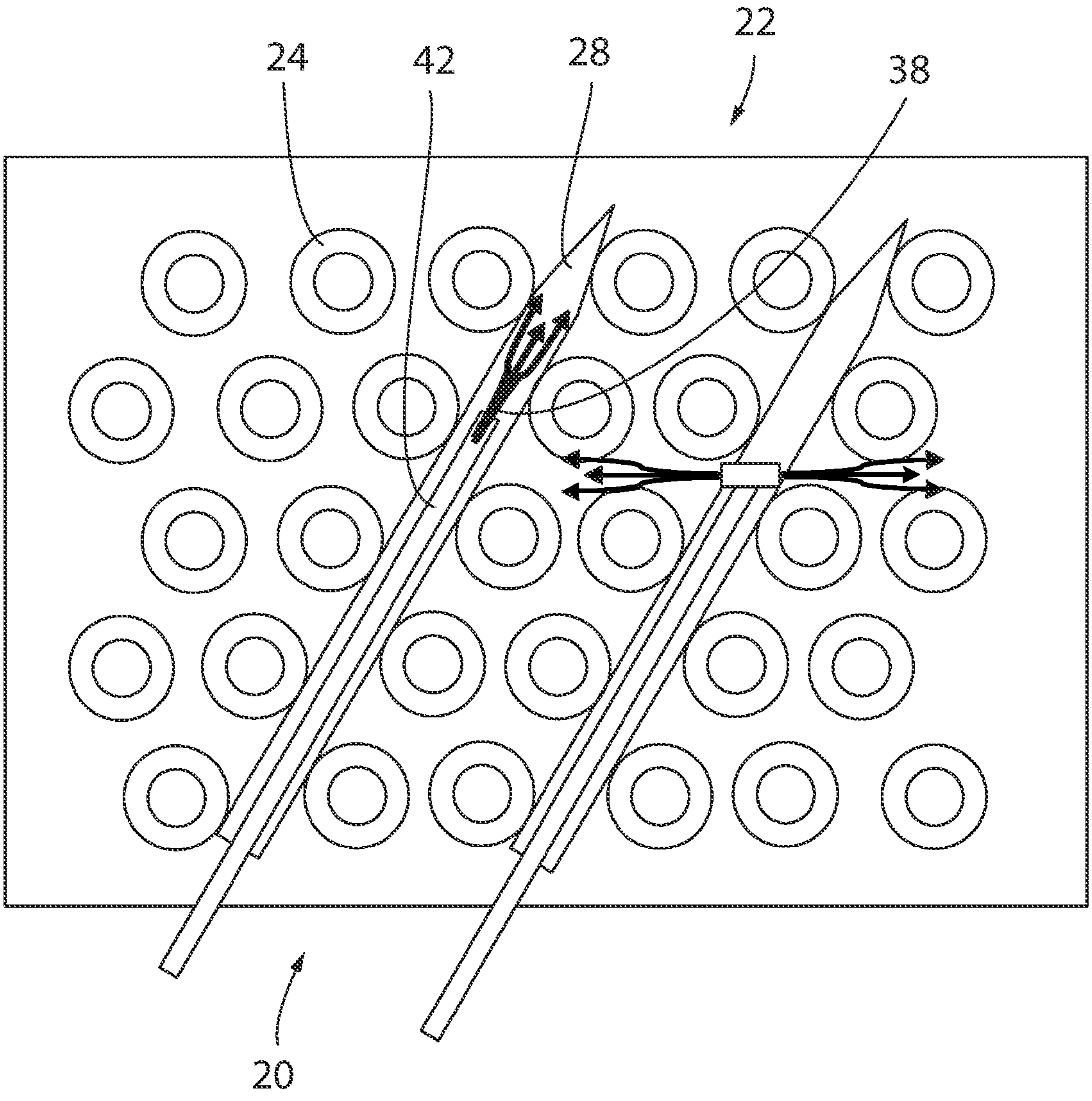
FIG. 8 is a top plan view of the deep cleaning alignment equipment with the wedge spreading the plurality of tubes and the cleaning wand dispensing a cleaning solution to the heat recovery steam generator where the tubes are in a staggered configuration.

A deep cleaning alignment equipment 20 and system for cleaning heat recovery steam generator systems 22 or other types of heat exchangers and associated tubes 24 is generally shown in the figures. While the equipment 20 will be described with relation to a heat recovery steam generator system 22, it should be noted that the equipment 20 could similarly be used in many other instances where the exterior of various tubes needs to be spread apart for cleaning purposes, such as in other heating, ventilation, and air conditioning applications. As seen in FIGS. 6 and 7, the tubes 24 may be configured to align with one another in an “in line” configuration. Alternatively, as shown in FIG. 8, the tubes 24 may be staggered relative to one another. Of course, other tube 24 configurations could similarly be used.

Figure 12:
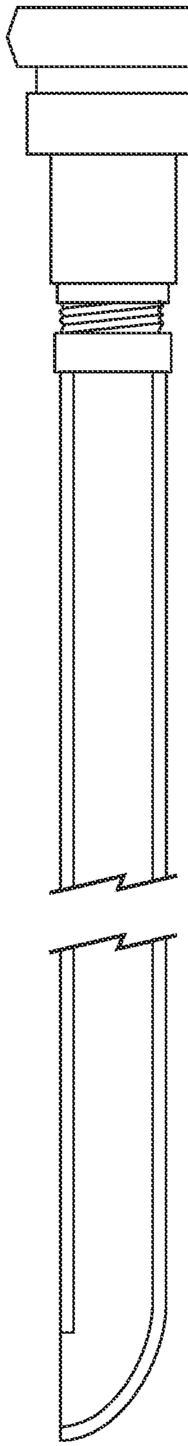
FIG. 12 is a perspective view of one potential nozzle used with the deep cleaning alignment equipment.
Figure 13:
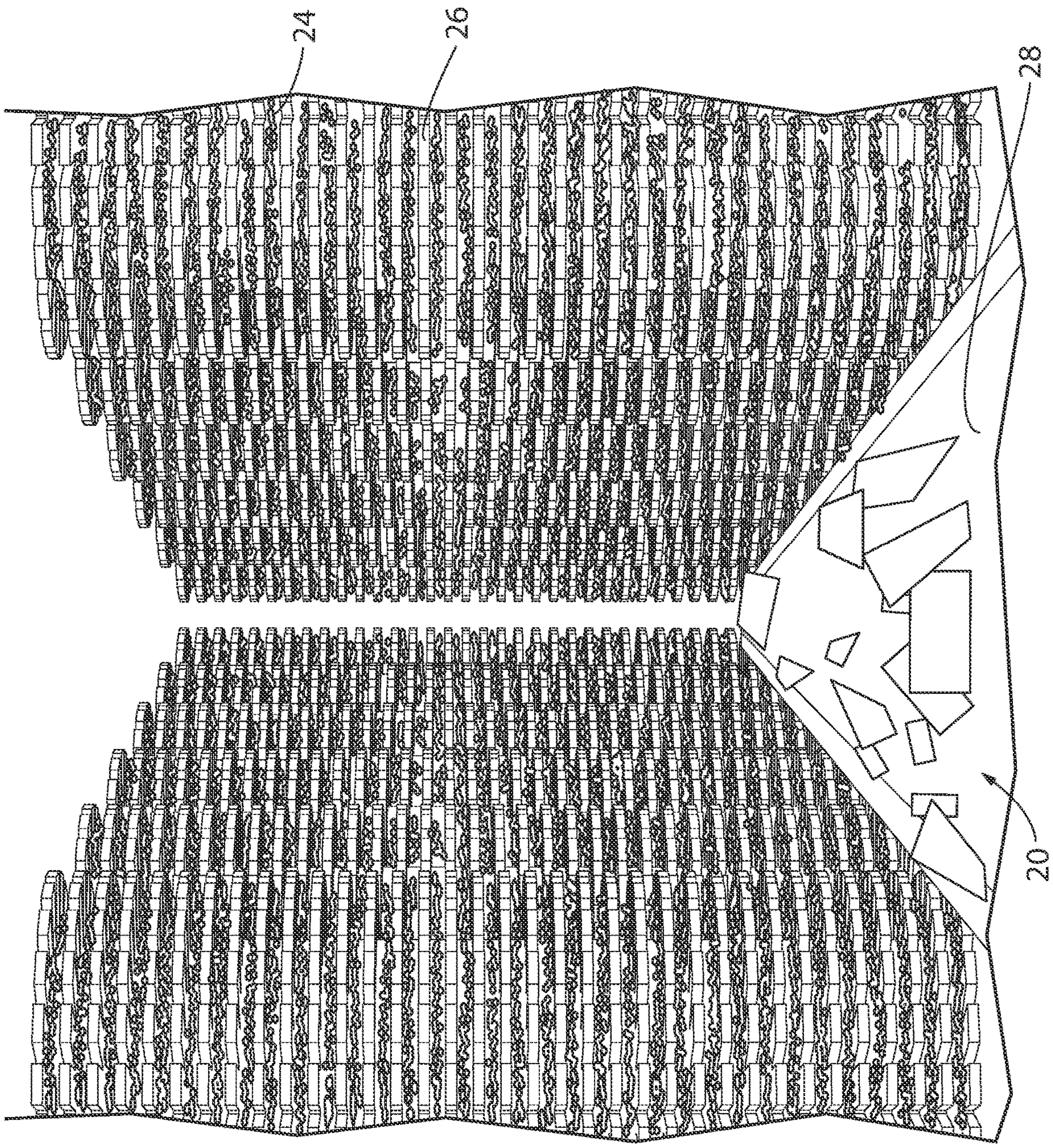
FIG. 13 is a perspective view of the deep cleaning alignment equipment where the wedge has been driven between tubes and fins associated with the heat recovery steam generator before cleaning has commenced.
Figure 14:
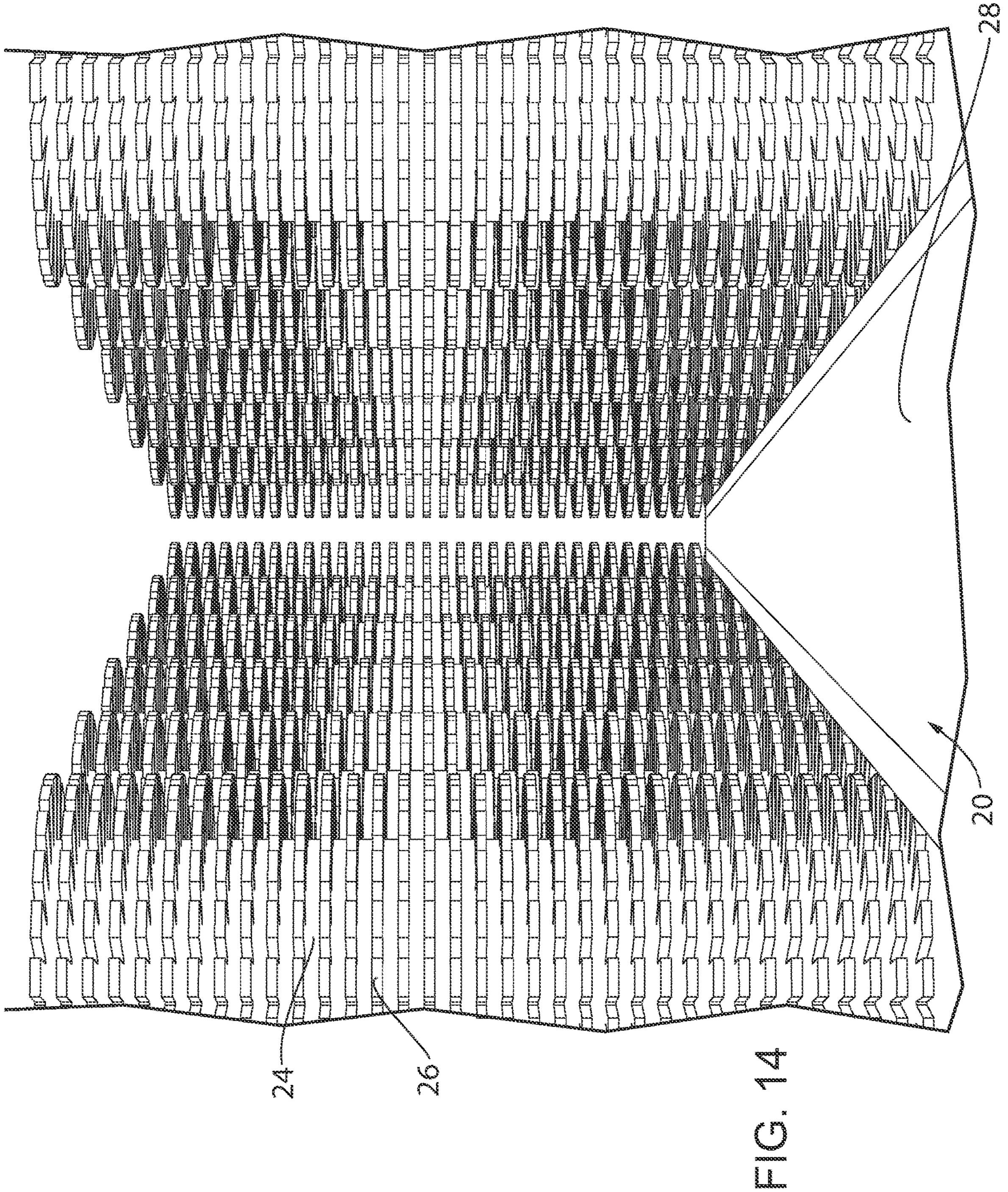
FIG. 14 is a perspective view of the deep cleaning alignment equipment where the wedge has been driven between tubes and fins associated with the heat recovery steam generator after cleaning has been completed.

The deep cleaning alignment equipment 20 is specifically designed to maximize the efficiency with which the heat recovery steam generator system 22 is cleaned. The heat recovery steam generator system 22 includes a plurality of tubes 24. As shown, these tubes 24 extend vertically about the system 22. However, the tubes 24 could similarly be horizontally mounted, or mounted at other angles as desired. Typically, these tubes 24 are made of steel, although they could similarly be made of other materials. While the figures merely show exemplary cylindrical tubes 24, it should be noted that the tubes 24 may include a plurality of fins 26 that extend outwardly from the tubes 24, as seen in FIGS. 12 and 13. While these fins are 26 not shown in all of the figures, it should be noted that the deep cleaning alignment equipment 20 is configured to be similarly compatible with any fins 26 or tubes 24 associated with a heat recovery steam generator system 22.

The deep cleaning alignment equipment 20 may include a wedge/alignment bar 28 and at least one wand 30, both of which will further be described below. The wedge 28 is configured to encourage outward movement of the various tubes 24 in order to create a channel 32 between the tubes 24. Once the channel 32 is formed, the at least one wand 30 is used to clean any materials located about the tubes 24. The wedge 28 may have a handle 56 to provide something a user can easily grasp to enhance use and movement of the wedge 28. However, the wedge 28 does not require the inclusion of a handle.

Next, the wedge/alignment bar 28 as shown in FIGS. 1-5 will be further described. Among other features, the wedge 28 preferably is elongate in shape, with an extended body 29 coming to a pointed end 31. As such, the wedge 28 could come in a number of different sizes. For instance, a wedge 28 that is longer and taller than other wedges traditionally used in this field could be used. As a result, when the wedge 28 is used, the surface area of the wedge 28 that contacts the tubes 24 can be increased. In turn, this decreases the amount of stress between the wedge 28 and the steel tube 24 about any specific point. This wedge 28 would be approximately eight inches deep in order to spread out the stress point on the about the wedge 28 and the tubes 24. This would also allow for a greater opening along the length of the tubes 24 which would allow better access for the cleaning wands 30. The width and the length of the wedge 28 would vary depending on the type of HRSG 22, width of module, type of arrangement, tube spacing specific to the module being cleaned, and any other factors that would impact the functionality of the deep cleaning alignment equipment 20.

A few embodiments will now be described, although it should be noted that these are exemplary, such that many other potential dimensioned wedges 28 could similarly be used. In a first embodiment, the wedge 28 could be between three-and-a-half and five feet in length. In this embodiment the wedge 28 could be between approximately one-half inch and one inch in width. The specific size could vary based on the size of the module. For instance, where a boiler module contains twelve rows of tubes 24, a three-and-a-half-foot wedge 28 would be used. For any modules having over twelve rows of tubes 24, the longer five-foot wedge 28 could be used. Where the tubes 24 are located in close proximation to one another, the skinnier one-half inch wide wedge 28 would initially be used. After the one-half inch wedge 28 is inserted, a one-inch wide wedge can be inserted to further space the tubes 24. Alternatively, tubes 24 with a greater initial distance from one another could simply be separated using the one-inch wide wedge 28.

According to another embodiment, the wedge 28 could be between two and six feet in length. In this embodiment the wedge 28 could be between approximately one-half inch and one-and-a-half inch in width. The wedge 28 could further be between one inch in height and eight inches in height.

In yet another embodiment, the wedge 28 could be between a quarter inch to two inches wide. Additionally, the wedge 28 could be between a half an inch and two inches wide. Also, the length of the wedge 28 could vary, for instance, between a foot long and ten feet long. Furthermore, the height of the wedge 28 could vary, between a half inch high and twelve inches high, and more preferably between one inch high and eight inches high.

In yet another embodiment, the wedge 28 may be from approximately six inches to approximately nine feet in length, and more preferably between approximately three feet and approximately five feet in length. Additionally, the wedge 28 may have a height of approximately a half of an inch to a height of approximately two feet, and more preferably has a height between approximately two inches and approximately eight inches. Further still, the wedge 28 may have a width of between approximately ⅛$^{th}$ of an inch and approximately four inches, and more preferably between approximately a half of an inch to approximately one and a half inches.

Another feature of the wedge 28 is that the wedge 28 may be made of a composite component. This composite component is preferably made up of material that is softer than the steel tubes 24 and fins 26. As a result, when the wedge 28 is inserted into the HRSG 22 and comes into contact with the tubes 24 and/or fins 26, any abrasion from sliding the wedge 28 in would be absorbed by the composite wedge 28 instead of the tubes 24 or fins 26. For instance, the wedge 28 could be made of a high strength carbon fiber nylon. In one embodiment, the wedge 28 is made of nylon 12CF. Nylon 12CF is a lightweight yet durable carbon-fiber reinforced thermoplastic. Thus, the wedge 28 is easily transportable due to its weight, but still durable enough to be used with deep cleaning alignment equipment 20. Alternatively, the wedge 28 could be made of any other material that is softer than the tubes 24 and fins 26 associated with the tubes 24, which are typically made of steel, for instance, various plastics, composites, and nylon materials. Of course, the wedge 28 could be configured such that it is both elongate and made of the composite component to minimize potential damage to the tubes 24 and fins 26.

Figure 9:
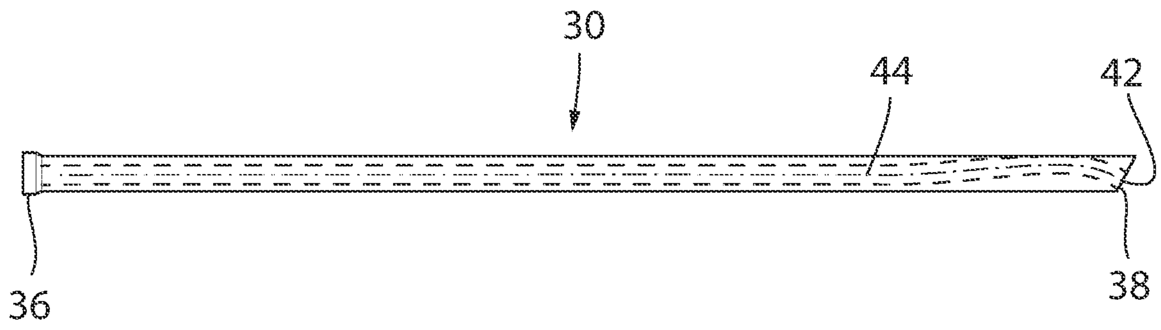
FIG. 9 is a perspective view of one embodiment of a wand used with the deep cleaning alignment equipment.
Figure 10:
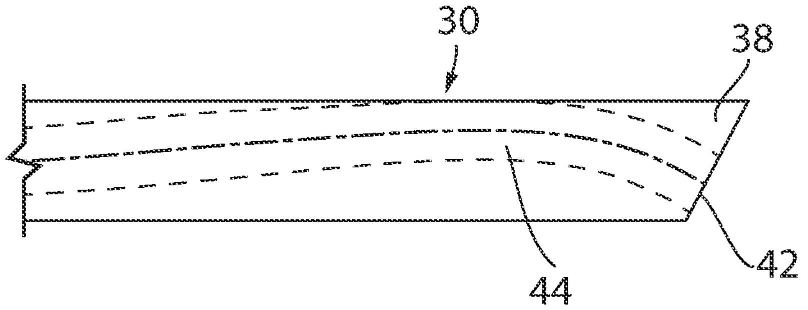
FIG. 10 is a detailed view of an exit of the wand of FIG. 9.
Figure 11:
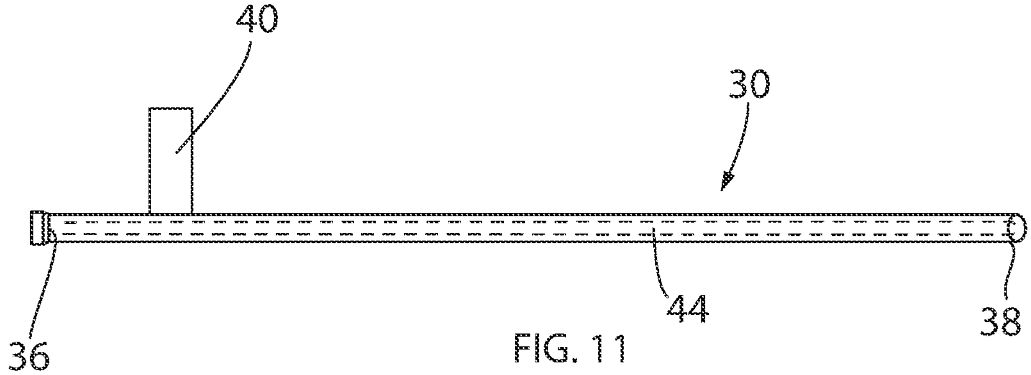
FIG. 11 is another perspective view of the wand including a handle associated therewith.

Additionally, the deep cleaning alignment equipment 20 may feature at least one cleaning wand 30, as shown in detail in FIGS. 9-11. The cleaning wand 30 is configured to spray a cleaning solution 34 of liquid or gas about the HRSG 22. More specifically, the cleaning wand 30 may be configured to spray dry ice. This could include high density dry ice ($CO_2$) pellets. These pellets will be propelled with ultra-high pressure air ranging from 200-350 psi. This would be advantageous as it would allow for cleaning of the HRSG 22 with the dry ice eventually evaporating. Of course, other types of media blasting could similarly occur. For instance, the cleaning wand 30 could similarly be configured to spray, other liquids or gas, including air, water, cleaning solution, and any other material capable of cleaning the tubes 24 and fins 26.

As shown, the cleaning wand 30 may have a first end 36 a second end 38. At the first end 36, the cleaning wand 30 may include a handle 40 to allow a user to firmly hold onto the cleaning wand 30 during use. At the second end 38, an exit 42 is formed. A supply channel 44 extends through the wand 30 to deliver the liquid or gas to the exit 42. The exit 42 may direct liquid or gas straight out of the wand 30. Alternatively, the exit 42 may direct liquid or gas out of the wand 30 at various angles. More specifically, FIGS. 7, 9, and 10 show a wand 30 capable of spraying liquid or gas out of the exit at an angle of approximately 45 degrees relative to the wand 30, although the wand 30 could similarly be configured to exit at an angle of approximately 30 degrees or any other desired angle. The wand 30 could also be capable of front blowing and side blowing to clean the tubes 24 and fins 26. Of course, the wands 30 could similarly blow liquid or gas at any other angle as desired. Additional wands 30 may also be used, such as a first wand to blow air to remove an initial layer of debris, and a second wand to shoot liquid or gas into the HRSG 22. Further still, the wand 30 may have any number of different nozzle assemblies 46 to vary the way the liquid or gas is distributed from the wand 30. For instance, FIG. 12 shows one potential nozzle 46 configuration.

Furthermore, the wands 30 may be made of steel or composite materials. The use of composite materials could be desired for the same reasons as with the composite wedge 28 to reduce potential damage to the tubes 24 or fins 26 when the wands 30 are quickly and rapidly moved about the tube 24 and fins 26, The wands 30 will be moved up and down the wedged channel 32 in order to clean the tubes 24 from all directions. Cleaning may take place from each side of the module (both upstream and downstream faces) with an overlap of the wedges 28 from each side.

Operating of the deep cleaning alignment equipment 20 will now be described. Initially, the wedge 28 will be inserted between two adjacent rows of tubes 24. In doing so, the adjacent rows of tubes 24 will be separated apart from one another to form a channel 32. Where the adjacent rows of tubes 24 are narrowly placed relative to one another, multiple wedges 28 may be used. For instance, a first wedge having a narrow width could be used to initially separate the tubes 24, after which a second wedge having a wider width to further separate out the tubes 24 to create a channel 32 through which the wand or wands 30 can be inserted. Once the channel 32 is formed, the wand or wands 30 can be removably inserted into the channel 32 to facilitate cleaning about the HRSG 22.

Figure 15:
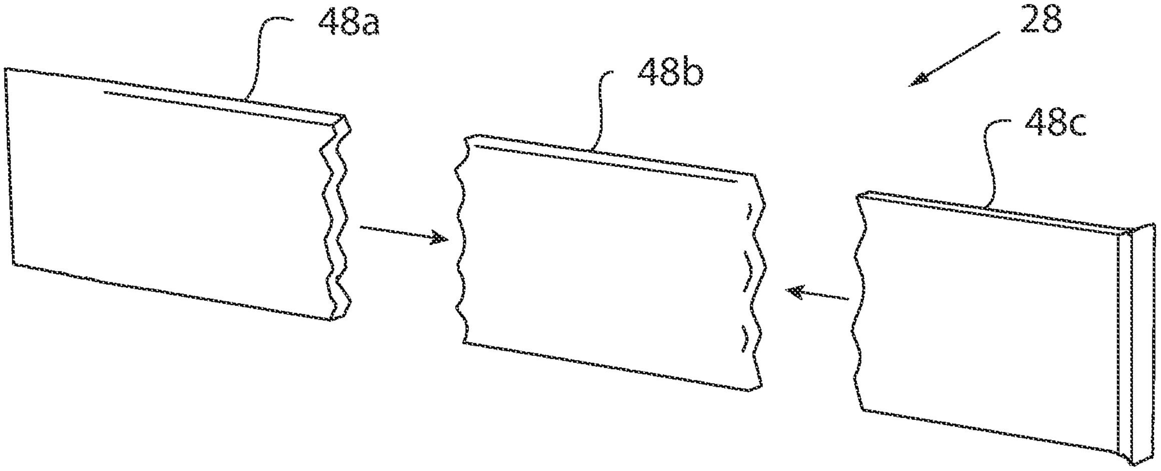
FIG. 15 is an exploded perspective view of an embodiment of the deep cleaning alignment equipment where the wedge is a multi-piece wedge.
Figure 16:
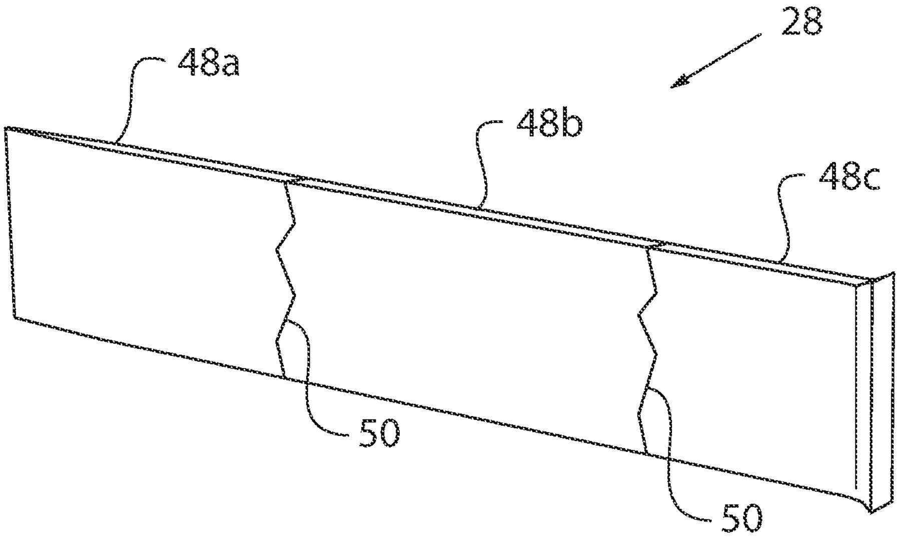
FIG. 16 is a perspective view of the wedge of FIG. 15 in an assembled view.

Additional features of the system will now be described. Turning initially to FIGS. 15 and 16, the elongate wedge 28 may be a multi-piece elongate wedge 28. These figures show an exemplary multi-piece elongate wedge, but other multi-piece wedges having different proportions could similarly be used. More specifically, the wedge 28 may comprise one or more pieces 48 that can be releasably connected to one another using a variety of connector interfaces 50. Such a wedge 28 is desirable because it makes it easier, cheaper, more efficient, etc. to ship the wedge 28 from one location to another. As shown, the wedge 28 has three sections **48*a*, 48*b*, 48*c* that can be releasably connected to one another. The various pieces/sections 48 may be releasably connected using any number of different connector interfaces 50. By way of example and not limitation, the connection interface 50 may be a threaded opening, such that adjacent pieces 48 may be rotated relative to one another so that the threaded section engages. In another embodiment, the connection interface 50 may be an interlocking section, with portion of adjacent pieces 48 interlocking with one another at the connection interface. Further still, the connection interface 50 may have a jigsaw or other connection. Regardless of what connection interface 50 is used, the connection interface 50 allows the various pieces 48 to quick and easily be releasably secured to one another with sufficient connection to operate as a wedge as described herein, after which the pieces 48** can be disengaged from one another.

Turning next to FIGS. 17-19 show another feature associated with the wedge 28. Again, the embodiment shown in these figures are not made to scale, but are shown with exaggerated dimensions, sizes, and proportions in order to demonstrate the underlying features. More specifically, the embodiment shown in these figures are to a wedge that has at least one, and as shown a plurality of holes or openings 52 formed in the side of wedge 28. Various devices, such as brackets, l-brackets, removal brackets, clips, bars, or any other device 54 capable of being inserted into the openings 52 can be used to engage with the wedge 28 in order to facilitate removal of the wedge 28. As known to those in the art, once the wedge 28 is installed, it can be difficult to remove the wedge 28 from a lane of a heat recovery steam generator system or other system. These holes or openings 52 help to facilitate this removal. As shown in FIG. 18, the wedge 28 is installed into a heat recovery steam generator system, with a single opening 52 exposed directly next to the handle 56. Again, the wedge 28 does not require a handle, but for the purposes of description of the location of the opening 52 the handle 56 is used as a point of reference to indicate the end of the wedge 28 that is not inserted into the system. When a user desires to remove the wedge 28 from the system, the device 54 is inserted into the first opening 52*a*. Thereafter, the device 54 is either manually grasped by a user and used as a cantilever, or otherwise connected to another device such as a pneumatic device. The user or pneumatic or other device pull the device 54 away from the system, and in turn pull the wedge 28 at least partially away from the system. When the wedge 28 is securely lodged in the system, it may only incrementally move out of the system, as shown in FIG. 20. In this second position shown in FIG. 20, a second opening 52*b* is exposed. Thereafter, the device 54 can be inserted in the second opening 52*b*, after which the process may be repeated. The wedge 28 may include as many openings as desired to facilitate incremental removal of the wedge 28 from the system. The holes or openings 52 may be sized and spaced relative to one another as desired. For instance, in certain embodiments, the holes are between approximately 1/16$^{th}$ of an inch from one another and approximately three feet from one another.

Some general background will now be provided relating to the HRSG process, as well as related components will now be provided.

HRSG Function and Design: As stated in Combine Cycle Theory, the combined cycle setup is a combination of a simple cycle gas turbine (Brayton cycle) and a steam power cycle (Rankine cycle). The Brayton cycle consists of the compressor, combustor, and combustion turbine.

HRSG Function: The exhaust gas from the combustion turbine becomes the heat source for the Rankine cycle portion of the combined cycle. Steam is generated in the heat recovery steam generator (HRSG). The HRSG recovers the waste heat available in the combustion turbine exhaust gas. The recovered heat is used to generate steam at high pressure and high temperature, and the steam is then used to generate power in the steam turbine/generator.

The HRSG is basically a heat exchanger composed of a series of preheaters (economizers), evaporator, reheaters, and superheaters. The HRSG also has supplemental firing in the duct that raises gas temperature and mass flow.

This section is intended to provide turbine operators with a basic understanding of heat recovery steam generator (HRSG) design and operation. The power generation block of the facility produces electrical power in two separate islands:

- The first island within the combined-cycle power block is the combustion turbine (CT) generator set.
- The second island is the HRSG steam turbine generator set.

The HRSG absorbs heat energy from the exhaust gas stream of the combustion turbine. The absorbed heat energy is converted to thermal energy as high temperature and pressure steam. The high-pressure steam is then used in a steam turbine generator set to produce rotational mechanical energy. The shaft of the steam turbine is connected to an electrical generator that then produces electrical power.

The waste heat is recovered from the combustion turbine exhaust gas stream through absorption by the HRSG. The exhaust gas stream is a large mass flow with temperature of up to 1,150 degrees Fahrenheit.

Most large HRSGs can be classified as a double-wide, triple-pressure level with reheat, supplementary fired unit of natural circulation design, installed behind a natural gas fired combustion turbine.

The steam generated by the HRSG is supplied to the steam turbine that drives the electrical generator system.

HRSG Design: The function of the combined cycle heat recovery steam generator (HRSG) system is to provide a method to extract sensible heat from the combustion turbine (CT) exhaust gas stream.

The heat is converted into usable steam by the heat transfer surfaces within the HRSG. The usable steam is generated in three separate and different pressure levels for use in a steam turbine (ST) generator set and for power augmentation of the CT.

The pressure levels and their associated components are:

- High pressure (HP)
- Intermediate pressure (IP)
- Low pressure (LP)
- Reheat (RH)
- Feedwater preheater (FWPH)

All generated steam from the HP, RH, and LP systems is supplied to the steam turbine, except for some LP steam used for deaeration. The IP steam is mixed with the cold RH return loop prior to being admitted to the steam turbine.

Typical heat recovery steam generator circuits have four major components:

- Superheaters
- Evaporators
- Economizers
- Drum

Since a triple-pressure system may be operated of HP, IP, and LP, these components may be used for each associated pressure. These components (with the exception of the drum) are arranged in series in the gas flow path within the HRSG. Essentially, this means that the heat transfer boiler circuits are not in parallel with one another with respect to CT exhaust gas flow. The gas, after having been used to heat the water/steam in the HRSG is released to the environment through a stack.

Heat Recovery Steam Generator: The HRSG does not have any moving parts, but it has thermal inertia, and rapid heating may result in high thermal stresses, which would affect the operating life of the HRSG. In a HRSG, the high-pressure drum is most vulnerable to buildup of thermal stresses if heating is done very rapidly. To preclude this possibility, the drum is heated in a controlled manner. The magnitude of the stress depends on the temperature difference which, in turn, depends on the material type thickness, operating pressure of the component, and the fatigue life cycles.

Controlling the pressure inside the drum can effectively control the temperature difference. If a certain temperature difference is close to the design limit, it can be controlled at that level by holding the pressure constant until the temperature difference decreases because of an increase in the component temperature due to conduction. The constant pressure or saturation temperature line on the drum heating chart indicates this.

Before an HRSG is put online, it is filled with water, and heat is applied. The cold metal takes some time to get heated, and time is required to soak the HRSG. The HRSG starts producing steam after a soaking period of a few minutes. If the steam is not released, then the pressure starts building up. The amount of steam produced and the increase in the pressure depend on the amount of heat supplied. More heat produces more steam, and pressure increases at a faster rate.

The drum pressure can be controlled either by relieving the generated steam or by controlling the heat input to the boiler.

Oftentimes, a combination of both means is used to accomplish the controlled heating of the HRSG. The steam is relieved by venting to the atmosphere or by sending it to a heat sink such as a condenser. Operating the CT at reduced load controls the heat input. A gas-side bypass system, which diverts part of the hot CT gasses to atmosphere, is sometimes used to control the heat input to the boiler. It is not necessary to run the CT at reduced load if a bypass system is provided.

High-Pressure Evaporator: In the HP EVAP section, the phase change between water and steam occurs. This phase change occurs due to the convective heat transfer or energy exchange between the CT exhaust gas stream and the water in the HP EVAP modules. The HP EVAP modules are all single-pass with no upper and lower header internal baffles. Steam/water mixture flows in upward direction through the tubes and escapes to the steam drum via riser system. Water is fed to the modules from the two downcomer feeder header assemblies. This is referred to as a natural circulation loop.

High-Pressure Steam Generator: The HPSG is composed of an economizer (HP ECON), evaporator (HP EVAP), and superheater (HP SH). The HPSG flow path is from the economizer to the steam drum/evaporator and finally to the superheater. The sections are located strategically in the exhaust gas stream according to the declining temperature of the exhaust gas and the increasing temperatures of the heated feedwater, thus providing maximum energy recovery from the CT exhaust. The location of these heat transfer surfaces may be found on the right side setting elevation drawing.

The HPSG is equipped with a system of three safety relief valves; typically, two are mounted vertically on top of the drum, and one is mounted vertically on the HP main steam header. All PSVs are closed during normal operation; however, in an overpressure situation, the HP superheater PSV will lift first. If the pressure continues to build, the HP drum PSVs will lift (lowest pressure setting first). The three PSVs are designed to relieve 100% of the total HP steam-generating capacity.

High-Pressure Economizer Each module is multipass on the water side and single-pass on the gas side. This is accomplished by internal baffles in the upper and lower module headers.

The HPEC receives feedwater from the feed pumps (provided by others) and absorbs heat from the CT exhaust gas, lowering the CT exhaust gas temperature and raising the water temperature to near saturation prior to entering the high-pressure steam drum.

High-Pressure Superheater: Steam on the inside of the tubes is received from the high-pressure steam drum at saturated temperature and is heated to final steam temperature.

The HP superheater is equipped with an interstage attemperator. The attemperator control valve and spray nozzle assembly typically is located between HP SHTR 2 and HP SHTR 3. The attemperator is supplied for final steam temperature control. The spray attemperation process uses water as the cooling media. The spray water is directly fed to the attemperator from the HP feed pumps discharge line. Final steam temperature control is important for protection of the superheater and equipment served by the HRSG. The spray attemperation is designed to limit final steam temperature at HP superheater outlet to final design steam temperature.

Intermediate Pressure Steam Generator: The IPSG is composed of an economizer (IP ECON), evaporator (IP EVAP), and superheater (IP SH). The IP steam generator economizer forms a tube bank consisting typically of two rows. The IP EVAP consists of many rows and the IP SH consists of typically only two rows. The IPSG flow path is from the economizer to the steam drum/evaporator and finally to the superheater. The sections are located strategically in the exhaust gas stream according to the declining temperature of the exhaust gas and the increasing temperatures of the heated feedwater, thus providing maximum energy recovery from the CT exhaust.

The IPSG is equipped with a system of three safety relief valves; typically, two are mounted vertically on top of the drum, and one is mounted vertically on the IP main steam header. All PSVs are closed during normal operation; however, in an overpressure situation, the IP superheater PSV will lift first. If the pressure continues to build, the IP drum PSVs will lift (lowest pressure setting first). The three PSVs are designed to relieve 100% of the total IP steam-generating capacity.

Intermediate Pressure Economizer Each module is multipass on the water side and single-pass on the gas side. This is accomplished by internal baffles in the upper and lower module headers. The IPEC receives feedwater from the feed pumps (provided by others) and absorbs heat from the CT exhaust gas, lowering the CT exhaust gas temperature and raising the water temperature to near saturation before entering the steam drum.

Intermediate Pressure Evaporator: In the IP EVAP section, the phase change between water and steam occurs. This phase change occurs due to the convective heat transfer or energy exchange between the CT exhaust gas stream and the water in the IP EVAP modules. The IP EVAP modules are all single-pass with no upper and lower header internal baffles. Steam/water mixture flows in upward direction through the tubes and escapes to the steam drum via riser system. Water is fed to the modules from the two downcomer feeder header assemblies. This is referred to as a natural circulation loop.

Intermediate Pressure Superheater: Steam on the inside of the tubes is received from the steam drum at saturated temperature and is heated to final steam temperature.

Reheater: Steam on the inside of the tubes is received from the cold reheat line at the HP steam turbine discharge. The cold reheat steam is superheated by the reheater to a final hot reheat steam temperature.

The RH is equipped with an interstage attemperator located prior to the final reheater module. The attemperator is supplied for final steam temperature control. The spray attemperation process uses water as the cooling media. The spray water is directly fed to the attemperator from the IP feed pumps discharge line. Final steam temperature control is important for protection of the reheater and equipment served by the HRSG.

Low-Pressure Steam Generator: The low-pressure steam generator includes an evaporator (LP EVAP) and a superheater (LPSH). The two are circuit components and are in-series interspersed within the HRSG setting. The LPSG flow path is from the LP ECON, to the steam drum/ evaporator, and finally to the superheater. There are no intervening valves between the steam drum and the superheater surface. The location of these heat transfer surfaces may be found on the Vogt-NEM sectional right-side elevation drawing.

The LPSG is equipped with a system of three safety relief valves; typically, two are mounted vertically on top of the drum, and one is mounted vertically on the LP main steam header. All PSVs are closed during normal operation; however, in an overpressure situation, the LP superheater PSV will lift first. If the pressure continues to build, the LP drum PSVs will lift (lowest pressure setting first). The three PSVs are designed to relieve 100% of the total LP steam-generating capacity, including maximum pegging steam.

Low-Pressure Evaporator: The LP EVAP modules are all single-pass with no upper and lower header internal baffles. The modules are oriented in this direction to allow steam bubbles generated to escape via the riser tubes to the steam drum. Water is fed to the modules from the downcomer feeder header assemblies. This is referred to as a natural circulation loop.

In the LP EVAP section, the phase change between water and steam or steam generation occurs. This phase change occurs due to the convective heat transfer or energy exchange between the gas turbine exhaust gas stream and the water in the LP EVAP tubes generating steam.

Low-Pressure Superheater: Steam on the inside of the tubes is received from the steam drum at saturated temperature and is heated to final steam temperature.

Feedwater Preheater: The modules have multiple passes on the water side. This is accomplished by internal baffles in the upper and lower headers.

The FW PHTR receives feedwater from the condensate pump system and absorbs heat from the gas turbine exhaust, lowering the gas temperature and raising the water temperature. The FW PHTR increases HRSG efficiency.

While the above description provides a number of potential uses of the deep cleaning alignment equipment, it should be noted that there are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. In addition, the individual components need not be fabricated from the disclosed materials but could be fabricated from virtually any suitable materials.

Moreover, the individual components need not be formed in the disclosed shapes, or assembled in the disclosed configuration, but could be provided in virtually any shape, and assembled in virtually any configuration to improve the efficiency with which the deep cleaning alignment equipment functions and to prevent damage to the HRSG. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A deep cleaning alignment equipment used to clean a heat recovery steam generator system including a plurality of metallic tubes, wherein each of the plurality of tubes includes a base with a plurality of fins extending outwardly from the base, the deep cleaning alignment equipment comprising:

an elongate wedge with a width, a length, and a height, and a plurality of openings extending through the width, wherein the elongate wedge is configured to contact and spread the plurality of tubes and the plurality of fins to form a channel therebetween;

a wand configured to spray one of a liquid or a gas about the heat recovery steam generator system; and a removal bracket;

wherein the elongate wedge contacts the plurality of tubes and the plurality of fins about an extended surface area;

wherein the elongate wedge is made of one of a composite material and a metallic material;

wherein the wand is removably insertable into the channel; and wherein the plurality of openings are configured to receive the removal bracket.

2. The deep cleaning alignment equipment of claim 1, wherein the elongate wedge is at least one half inch in height.

3. The deep cleaning alignment equipment of claim 2, wherein the elongate wedge is less than two feet in height.

4. The deep cleaning alignment equipment of claim 1, wherein the elongate wedge is at least one-eighth inch in width.

5. The deep cleaning alignment equipment of claim 4, wherein the elongate wedge is less than four inches in width.

6. The deep cleaning alignment equipment of claim 1, wherein the elongate wedge is at least six inches in length.

7. The deep cleaning alignment equipment of claim 6, wherein the elongate wedge is less than nine feet in length.

8. The deep cleaning alignment equipment of claim 1, wherein the elongate wedge further comprises:

at least two pieces; and a connector interface configured to releasably secure the at least two pieces together.

9. The deep cleaning alignment equipment of claim 1, wherein the removal bracket further comprises an L-shaped bracket configured to be removably inserted into one or more of the plurality of openings.

10. The deep cleaning alignment equipment of claim 9, wherein the L-shaped bracket further comprises:

an elongate bar having a first end and a second end; and a protrusion extending substantially horizontally from the elongate bar at the first end;

wherein the protrusion is releasably inserted into one or more of the plurality of openings.

11. A deep cleaning alignment equipment used to clean a heat recovery steam generator system including a plurality of metallic tubes, wherein each of the plurality of tubes includes a base with a plurality of fins extending outwardly from the base, the deep cleaning alignment equipment comprising:

an elongate wedge with at least one opening extending therethrough, wherein the elongate wedge is configured to contact and spread the plurality of tubes and fins to form a channel therebetween;

a wand configured to spray one of a liquid or a gas about the heat recovery steam generator system; and a removal bracket;

wherein the elongate wedge contacts the plurality of tubes and the plurality of fins about an extended surface area; and wherein the wand is removably insertable into the channel; and wherein the at least one opening is configured to receive the removal bracket.

12. The deep cleaning alignment equipment of claim 11, wherein the composite wedge is made of high strength carbon fiber nylon.

13. The deep cleaning alignment equipment of claim 11, wherein the composite wedge further comprises a plurality of openings formed therein.

14. The deep cleaning alignment equipment of claim 11, further comprising:

a first blowing wand configured to push debris forward; and a second shooting wand that shoots a liquid or a gas.

15. The deep cleaning alignment equipment of claim 11, further comprising a connector interface configured to secure the first piece to the second piece.

16. The deep cleaning alignment equipment of claim 14, wherein the second shooting wand shoots dry ice.

17. The deep cleaning alignment equipment of claim 11, wherein the composite wedge is an elongate wedge configured to minimize stress between the composite wedge and the plurality of tubes and the plurality of fins.

18. The deep cleaning alignment equipment of claim 11, wherein the removal bracket further comprises an L-shaped bracket configured to be removably inserted into the at least one opening;

wherein the L-shaped bracket further comprises:

an elongate bar having a first end and a second end; and a protrusion extending substantially horizontally from the elongate bar at the first end;

wherein the protrusion is releasably inserted into the at least one opening.

19. A method of using a deep cleaning alignment equipment to clean a heat recovery steam generator system including a plurality of metallic tubes, the method comprising the steps of:

inserting a wedge having a width, a length, and a height, between the plurality of tubes to spread the plurality of tubes to form a channel therebetween;

inserting a wand into the channel;

spraying a liquid or a gas through the wand to clean the plurality of tubes; and inserting a bracket into at least one opening extending through the wedge;

manipulating the bracket away from the plurality of metallic tubes to remove the wedge from the plurality of tubes;

wherein the elongate wedge contacts the plurality of tubes about an extended surface area; and wherein the composite is a softer material than the metallic material of the plurality of tubes.

20. The method of claim 19, further comprising the steps of:

releasably securing a first piece of the wedge to a second piece of the wedge;

inserting the wedge between the plurality of tubes to spread the plurality of tubes to form the channel therebetween;

removing the wedge from the plurality of tubes; and releasing the first piece from the second piece.

* * * * *